United States Patent [19]

Brunnmueller et al.

[11] 4,421,602
[45] Dec. 20, 1983

[54] LINEAR BASIC POLYMERS, THEIR PREPARATION AND THEIR USE

[75] Inventors: Fritz Brunnmueller, Limburgerhof; Rolf Schneider; Michael Kroener, both of Mannheim; Hans Mueller, Ludwigshafen; Friedrich Linhart, Heidelberg, all of Fed. Rep. of Germany

[73] Assignee: BASF Aktiengesellschaft, Rheinland-Pfalz, Fed. Rep. of Germany

[21] Appl. No.: 397,234

[22] Filed: Jul. 12, 1982

[30] Foreign Application Priority Data

Jul. 18, 1981 [DE] Fed. Rep. of Germany ....... 3128478

[51] Int. Cl.$^3$ .......................... C08F 22/36; D21H 3/38
[52] U.S. Cl. .............................. 162/168.2; 526/303.1; 525/328.2
[58] Field of Search .................. 526/303.1; 162/168.2; 525/328.2

[56] References Cited

U.S. PATENT DOCUMENTS

| | | | |
|---|---|---|---|
| 3,597,314 | 8/1971 | Taube et al. | 162/168.2 |
| 3,609,132 | 9/1971 | Tsuk et al. | 260/85.7 |
| 3,702,800 | 11/1972 | Tsuk et al. | 162/168.2 |
| 4,070,530 | 1/1978 | Hobbs | 526/310 |

FOREIGN PATENT DOCUMENTS 1495692 11/1969 Fed. Rep. of Germany ... 526/303.1
1817309 7/1970 Fed. Rep. of Germany .

OTHER PUBLICATIONS

Chemical Abstracts, vol. 84, No. 2, Jan. 12, 1976, No. 5731h.

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

Linear basic polymers containing, as characteristic components, from 90 to 10 mole % of copolymerized units of the formula

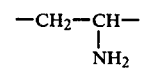

and from 10 to 90 mole % of copolymerized units of the formula

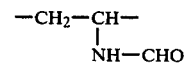

are obtained by polymerizing the compound of the formula $CH_2=CH-NH-CHO$ (N-vinylformamide) to a polyvinylformamide in the presence of a free radical polymerization initiator and splitting off the formyl group from the resulting polymer at from 20° to 200° in the presence of an acid or base. The reaction products are used as retention agents, drainage assistants and flocculants in papermaking.

8 Claims, No Drawings

LINEAR BASIC POLYMERS, THEIR PREPARATION AND THEIR USE

German Laid-Open application DOS No. 1,720,737 discloses a process for the preparation of basic polymers in which poly-N-vinyl-N-methylcarboxylic acid amides are subjected to acid hydrolysis at elevated temperature to give basic polymers with secondary amino groups. It is true that hydrolysis of the formyl compounds proceeds sufficiently rapidly at from 100° to 110° C., but, as described in Example 2, stoichiometric amounts of hydrochloric acid at about 100° C. result in a degree of hydrolysis of only 62 mole %. As described in Example 1, 2.6 moles of hydrochloric acid per mole of formyl group equivalent at from 108° to 109° C. are required to achieve a degree of hydrolysis of 93 mole %. The polymers are thereby in some cases modified to an undesirable extent.

German Laid-Open application DOS No. 1,692,854 discloses the addition of polymers of N-vinyl-N-methylcarboxylic acid amides to stock as drainage assistants to improve the drainage rate in papermaking. However, the effectiveness of these drainage assistants is still in need of improvement.

It is an object of the present invention to provide linear basic polymers which contain, as the characteristic component, copolymerized units of the formula

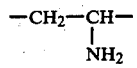

and which are better than conventional basic polymers when used as retention agents, drainage assistants and flocculants in papermaking.

We have found that this object is achieved, according to the invention, with linear basic polymers which contain from 90 to 10 mole % of units of the formula

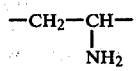

and from 10 to 90 mole % of units of the formula

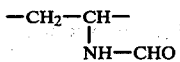

and have a Fikentscher K value of from 10 to 200 (measured in 0.5% strength aqueous sodium chloride solution at 25° C.).

The preparation of the compound of the formula $CH_2=CH-NH-CHO$ (N-vinylformamide) was first disclosed in German Published application DAS No. 1,224,304. Homopolymerization of N-vinylformamide has not yet been disclosed. We have found that N-vinylformamide can be polymerized using free radical polymerization initiators, e.g. peroxides, hydroperoxides, redox catalysts, or azo compounds which dissociate into free radicals, preferably those azo compounds described for this purpose in German Laid-Open application DOS No. 1,495,692. The polymerization is carried out in a solvent or diluent at from 30° to 140° C. The molecular weight of the polymers varies, depending on the polymerization conditions, and is characterized in the text which follows by means of the Fikentscher K value. The K value can vary within wide limits, for example from 10 to 200. Polymers having a high K value, e.g. above 80, are preferably prepared by polymerizing N-vinylformamide in water. Polymers having a lower K value, e.g. below 80, are obtained by carrying out the polymerization in the presence of known regulators or in a solvent which regulates the polymerization, e.g. an alcohol, such as methanol, ethanol or n- or iso-propanol, or acetone or methyl ethyl ketone. Examples of other polymerization regulators are hydroxylammonium salts, chlorinated hydrocarbons and thio compounds, e.g. dodecylmercaptan. Polymers having a lower K value can be prepared by, for example, polymerizing N-vinylformamide in isopropanol using an isopropanol-soluble polymerization initiator based on an azo compound. 2,2'-Azo-bis-(isobutyronitrile) is an example of a particularly suitable azo compound for the polymerization in isopropanol. High molecular weight polymers of N-vinylformamide are prepared using water-soluble azo compounds, e.g. 2,2'-azo-bis-(2-amidinopropane) hydrochloride or 4,4'-azo-bis-(4'-cyano-pentanoic acid), the reaction being carried out in aqueous solution. As well as by solution polymerization in water, a water-soluble solvent or a mixture of water and a water-soluble solvent, the polymerization can also be carried out as a water-in-oil emulsion polymerization in a water-immiscible solvent. The reverse suspension polymerization can also be used for the preparation of finely divided polymers. If an aqueous medium is used, the pH during polymerization is from 4 to 9, preferably from 5 to 7. In the case of solution polymerization, polymer solutions having a solids content of from 5 to 50% by weight, preferably from 3 to 30% by weight, are predominantly prepared.

Poly-(1-aminoethylenes) are prepared from the polymerization product by solvolysis in the presence of acids or bases at from 20° to 200° C., preferably from 40° to 180° C. and particularly preferably from 70° to 90° C., the formyl group being split off. From about 0.05 to 1.5 equivalents (for the purposes of this invention, one equivalent is 1 gram equivalent) of an acid, e.g. hydrochloric acid, hydrobromic acid, phosphoric acid or sulfuric acid, are required per formyl group equivalent in the poly-N-vinylformamide. The pH in the case of acid hydrolysisis from 5 to 0, preferably from 3 to 0, and can be established by addition of a carboxylic acid, e.g. formic acid, acetic acid or propionic acid, a sulfonic acid, e.g. benzenesulfonic acid or toluene-solfonic acid, or an inorganic acid, e.g. hydrochloric acid, sulfuric acid, phosphoric acid or hydrobromic acid. The hydrolysis proceeds substantially more rapidly than that of N-methyl-N-vinylformamide polymers and can therefore be carried out under milder conditions, i.e. at lower temperatures and without an excess of acid.

Solvolysis of the formyl groups in the poly-N-vinylformamide can also be carried out in an alkaline medium, for example at a pH of from 9 to 14. This pH is preferably established by addition of sodium hydroxide solution or potassium hydroxide solution, but it is also possible to use ammonia, an amine or an alkaline earth metal base, e.g. calcium hydroxide. From 0.05 to 1.5, preferably from 0.4 to 1.0, equivalents of a base are used for the alkaline hydrolysis.

The formyl group can be split off in various solvents, e.g. in water, an alcohol, ammonia or an amine, or a mixture of, for example, water and an alcohol, or an aqueous solution of ammonia and/or an amine. In some cases, it may be advantageous to carry out the solvolysis in an inert diluent, e.g. in dioxane or an aliphatic or aromatic hydrocarbon. Poly-(1-aminoethylenes) are obtained in all cases. In the case of hydrolysis, the formyl group is split off from the poly-N-vinylformamide by an acid or base in water, and formic acid or a salt of formic acid is obtained as a by-product. In the case of solvolysis in an alcohol, also in the presence of an acid or base, a formic acid ester is obtained as a by-product, while formamide or a substituted formamide is obtained if the solvolysis is carried out in ammonia or an amine. Particularly suitable alcohols for the solvolysis are low-boiling alcohols, e.g. methanol, ethanol, isopropanol, n-propanol, n-butanol and isobutanol.

The solvolysis by-products can be removed from the system either during or after solvolysis. Thus, for example, if alcohol is used as the solvent, it is possible to remove the resulting formic acid ester azeotropically from the reaction mixture, in which case an entraining agent may be necessary. The hydrolysis by-product (formic acid) can also be removed from the system during or after hydrolysis. Preferably, the polyvinylformamide is hydrolyzed with sodium hydroxide solution or hydrochloric acid at from 70° to 90° C. in aqueous solution. The K value of the hydrolyzed polymer corresponds to that of the non-hydrolyzed N-vinylformamide homopolymer.

The polyvinylformamides are thereby partially hydrolyzed, so that from 10 to 90%, preferably from 20 to 90%, of the formyl groups are split off. In this manner, polymers are obtained which contain from 90 to 10 mole % of units of the formula

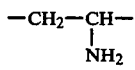

and from 10 to 90 mole % of units of the formula

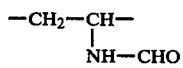

in random distribution and which can be defined, for example, by the following formula:

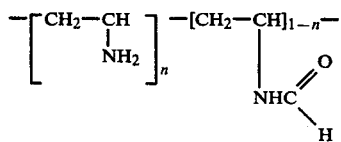

where n is a number from 0.1 to 0.9, preferably from 0.2 to 0.9.

The hydrolysis depends on the reaction conditions, and can be carried out under atmospheric, reduced or superatmospheric pressure. Aqueous or alcoholic solutions are obtained, from which the polymer can be isolated after the low molecular weight constituents have been separated off. However, the aqueous or alcoholic solutions obtained during solvolysis can also be used directly as retention agents, drainage assistants and flocculants in papermaking. These polymers have an excellent action which is superior to that of conventional commercial products, e.g. polyethyleneimines, or polyamidoamines modified with ethyleneisimine. In the case of hydrolysis with bases, polymers with free amino groups are obtained, while hydrolysis with acids gives the corresponding polymer salts, from which, however, polymers having free amino groups can likewise be obtained after addition of a base, e.g. sodium hydroxide solution or potassium hydroxide solution.

The linear basic polymers according to the invention are used to accelerate drainage of the wet fiber web and to increase the retention of fines and fillers by cellulose fibers during papermaking. Faster drainage of the stock on the papermaking machine enables the speed of the machine and hence production to be increased. Moreover, these compounds permit better sheet formation and reduce the water content of the still moist paper, so that less energy is required for drying the sheet than when conventional drainage and retention agents are used.

Improved retention during papermaking saves raw materials, enables cheaper fillers to be used instead of more expensive fibers, reduces the circulation of water through the paper mill and, as a result of better and more uniform fixing of fines and fillers, improves the printability of the paper. It also means that less material passes into the effluent.

From 0.005 to 0.5% by weight, preferably from 0.01 to 0.1% by weight, based on the dry fiber, of the poly-(1-aminoethylenes) obtained in the solvolysis of poly-N-vinylformamides is added to the stock before sheet formation for papermaking. Particularly advantageous effects are obtained with basic polymers having a K value above 80.

The K value of the polymers was measured in 0.5% strength aqueous sodium chloride solution at 25° C. by the method of H. Fikentscher, Cellulosechemie 13 (1932), 58 to 64 and 71 to 74; $K=k.10^3$.

1. Preparation of the Polymers

EXAMPLE 1.1

80 g (1,125 mmoles) of vinylformamide were dissolved in 385 g of water in a flask provided with a stirrer, a thermometer and an apparatus for working under nitrogen. 1.3 g (4.8 mmoles) of 2,2'-azo-bis-(2-amidinopropane) hydrochloride were added, the oxygen was removed by passing in nitrogen and the reaction mixture was heated to 60° C. in the course of half an hour and kept at this temperature for 5 hours. The conversion was then 99.3%.

450 g of 10% strength sodium hydroxide solution (1,125 mmoles) were then added to the resulting viscous polymer solution, which had a K value of 81, and the mixture was heated at 80° C. for 5 hours, to give a polymer in which all the formyl groups had been split off (degree of hydrolysis=90%). A total of 916 g of an aqueous polymer solution having a Brookfield viscosity, measured at 25° C., of 140 mPa.s were obtained.

EXAMPLE 1.2

80 g of N-vinylformamide were dissolved in 385 g of water in the apparatus described in Example 1.1, and were polymerized to a conversion of 98.1% in the course of 5 hours at 55° C. by addition of 0.65 g of 2,2'-azo-bis-(2-amidinopropane) hydrochloride. The resulting polymer, which had a K value of 95, was heated at 80° C. with 23 g of 36% strength hydrochloric acid (227 mmoles) for 3 hours to give 489 g of a polymer solution in which 20% of the formyl groups had been split off from the polymer. The Brookfield viscosity of the solution, measured at 25° C., was 16,000 mPa.s.

EXAMPLE 1.3

80 g of N-vinylformamide were dissolved in 385 g of water in the apparatus described in Example 1.1, 0.65 g of the azo compound described in Example 1.1 was added, as a polymerization inhibitor, and the mixture was heated to 55° C. in the course of 1 hour. Polymerization was carried out at 55° C. in the course of 5 hours. After the polymerization, the reaction mixture was heated for another half an hour at 60° C. to complete the conversion, which was then 100%. The resulting polymer, which had a K value of 120, was then hydrolyzed with 68.5 g of 36% strength hydrochloric acid (676 mmoles) at 90° C. for 2 hours to give 534.5 g of an aqueous polymer solution having a Brookfield viscosity, measured at 25° C., of 10,500 mPa.s. 60% of the formyl groups of the polymer employed in the hydrolysis had been split off.

2. Use of the polymers as retention agents, drainage assistants and flocculants

The following polymers were used:

Polymer I:
A commercially available high molecular weight polyethyleneimine

Polymer II:
A polyamidoamine obtained from adipic acid and diethylenetriamine, onto which ethyleneimine had been grafted and which had been crosslinked with polyethylene glycol dichlorohydrin ether containing 9 ethylene oxide units, cf. Example 3 of German Patent No. 2,434,816.

Polymer III:
The polymer according to Example 1.3

Polymer IV:
The polymer according to Example 1.2

Polymer V:
The polymer according to Example 1.1

Polymer VI:
The polymer according to Example 1.3, but polymerized only up to a K value of 102 and with 82% of the formyl groups removed by hydrolysis with hydrochloric acid.

Polymer VII:
A polymer obtained from N-methyl-N-vinylformamide, which had a K value of 106 and had been hydrolyzed to the extent of 75% with hydrochloric acid (prepared according to Example 2 of German Laid-Open application DOS No. 1,692,854).

EXAMPLE 2.1

Various amounts of the polymers to be tested were added to 1 l of ligneous, kaolin-containing newsprint stock having a consistency of 2 g/l and a pH of 7.8, and a Schopper-Riegler apparatus was used to determine the SR freeness and the drainage time, ie. the time taken for 700 ml of back water to run out of the apparatus. The polymers used and the results achieved therewith are shown in Table 1.

TABLE 1

| | Freeness (SR) and drainage time (sec) with a polymer addition of | | | | | |
|---|---|---|---|---|---|---|
| | 0.02% | 0.06% | 0.1% | 0.02% | 0.06% | 0.1% |
| no addition | | 64 | | | 99.2 | |
| Polymer I (comparative) | 57 | 45 | 40 | 75.2 | 47.4 | 39.4 |
| Polymer II (comparative) | 54 | 40 | 36 | 67.2 | 39.6 | 32.5 |

TABLE 1-continued

| | Freeness (SR) and drainage time (sec) with a polymer addition of | | | | | |
|---|---|---|---|---|---|---|
| | 0.02% | 0.06% | 0.1% | 0.02% | 0.06% | 0.1% |
| Polymer III (according to the invention) | 46 | 33 | 30 | 51.0 | 28.8 | 24.8 |

EXAMPLE 2.2

The drainage-accelerating effect of polymer V was tested by the procedure described in Example 2.1. Polymer II was used for comparison with the prior art. The results are shown in Table 2.

TABLE 2

| | Freeness (SR) and drainage time (sec) with a polymer addition of | | | |
|---|---|---|---|---|
| | 0.06% | 0.1% | 0.06% | 0.1% |
| no addition | 66 | | 107.5 | |
| Polymer II (comparative) | 50 | 41 | 56.8 | 41.4 |
| Polymer V | 47 | 38 | 51.0 | 36.3 |

EXAMPLE 2.3

Various amounts of the polymers shown in Table 3 were added to 1 l of stock comprising 80% of bleached sulfite pulp and 20% of kaolin and having an alum content of 0.5% and a pH of 6, and sheets of paper were then produced with the aid of a Rapid-Köthen sheet-forming apparatus. The weight per unit area of the sheets of paper and their filler content, which was determined by ashing, are criteria for the effectiveness of the polymer. The higher the weight per unit area and the filler content of the sheets of paper, the more effective the retention agent.

TABLE 3

| | Weight per unit area (g/cm$^2$) and ash content (%) with a polymer addition of | | | | | |
|---|---|---|---|---|---|---|
| | 0.02% | 0.04% | 0.06% | 0.02% | 0.04% | 0.06% |
| no addition | | 58.0 | | | 4.2 | |
| Polymer I (comparative) | 61.3 | 62.1 | 62.6 | 7.7 | 9.1 | 9.7 |
| Polymer II (comparative) | 62.3 | 64.1 | 64.5 | 9.6 | 11.7 | 12.0 |
| Polymer III | 67.6 | 69.9 | 70.8 | 12.0 | 14.7 | 14.7 |

EXAMPLE 2.4

The filler retention was determined as described in Example 2.3, using a stock comprising 80% of bleached sulfite pulp and 20% of kaolin and having an alum content of 1.5% and a pH of 4.8. The effectiveness of polymer IV was compared with the conventional retention agents I and II, and the results are summarized in Table 4.

TABLE 4

| | Ash content with a polymer addition of | | |
|---|---|---|---|
| | 0.02% | 0.04% | 0.06% |
| no addition | | 3.7 | |
| Polymer I (comparative) | 5.8 | 6.3 | 7.0 |
| Polymer II (comparative) | 8.8 | 9.5 | 9.9 |
| Polymer IV | 10.9 | 11.9 | 12.6 |

EXAMPLE 2.5

To determine the flocculating effect and the purification effect on waste water of the polymers according to the invention, various amounts of the polymers shown in Table 5 were added to a stock rich in fines and containing, per liter, 1 g of sulfite pulp and 0.25 g of kaolin. The suspension was stirred and allowed to settle, and the transparency of the supernatant purified water was in each case determined photometrically. The results are summarized in Table 5.

TABLE 5

| | Transparency (%) with a polymer addition of | |
|---|---|---|
| | 0.02% | 0.04% |
| no addition | 19.0 | |
| Polymer I (comparative) | 42.0 | 60.8 |
| Polymer II (comparative) | 41.9 | 52.1 |
| Polymer III | 57.5 | 77.8 |

EXAMPLE 2.6

Various amounts of the polymers to be tested were added to 1 l of a ligneous, kaolin-containing newsprint stock having a consistency of 2 g/l and a pH of 7.8, and a Schopper-Riegler apparatus was used to determine the SR freeness and the drainage time, i.e. the time taken for 700 ml of back water to run out of the apparatus. The polymers used and the results achieved therewith are shown in Table 6.

TABLE 6

| | Freeness (SR) and drainage time (sec) with a polymer addition of | | | | | |
|---|---|---|---|---|---|---|
| | 0.02% | 0.06% | 0.1% | 0.02% | 0.06% | 0.1% |
| no addition | | 62 | | | 99.3 | |
| | | 61 | | | 101.0 | |
| Polymer II (comparative) | 51 | 38 | 34 | 68.0 | 40.1 | 34.0 |
| | 51 | 39 | 34 | 68.2 | 40.2 | 34.0 |
| Polymer VII (comparative) | 50 | 50 | 50 | 66.8 | 64.6 | 66.0 |
| | 50 | 49 | 50 | 66.5 | 63.8 | 67.0 |
| Polymer VI | 49 | 34 | 31 | 61.4 | 33.4 | 29.3 |
| | 49 | 33 | 31 | 62.0 | 32.3 | 29.5 |

The effectiveness of the polymer VI used according to the invention has been improved, compared with that of the closest prior art (Polymer VII), in a manner which could not be predicted.

EXAMPLE 2.7

The filler retention was determined on a stock comprising 80% of bleached sulfite pulp and 20% of kaolin and having an alum content of 0.5% and a pH of 6.0. Various amounts of the polymers shown in Table 7 were added to 1 l of this stock, and sheets of paper were then produced with the aid of a Rapid-Köthen sheet-forming apparatus. The filler content of the sheets of paper, which was determined by ashing, is a criterion of the effectiveness of the polymer as a retention agent.

TABLE 7

| | Ash content with a polymer addition of | | |
|---|---|---|---|
| | 0.02% | 0.04% | 0.06% |
| no addition | | 3.7 | |
| Polymer II (comparative) | 9.3 | 10.6 | 11.5 |
| Polymer VII (comparative) | 10.0 | 9.8 | 9.9 |
| Polymer VI | 9.6 | 12.1 | 13.1 |

We claim:

1. A linear basic polymer containing from 90 to 10 mole % of units of the formula

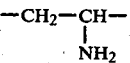

and from 10 to 90 mole % of units of the formula

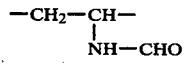

and having a Fikentscher K value of from 10 to 200 (measured in 0.5% strength aqueous sodium chloride solution at 25° C.).

2. A process for the preparation of a linear basic polymer as claimed in claim 1, wherein the compound of the formula $CH_2=CH-NH-CHO$ (N-vinylformamide) is polymerized to a polyvinylformamide in the presence of a free radical polymerization initiator, and the resulting polymer is solvolyzed at from 20° to 200° C. in the presence of an acid or base, from 10 to 90% of the formyl groups being split off from the N-vinylformamide homopolymer.

3. A process as claimed in claim 2, wherein vinylformamide is polymerized in aqueous solution using a polymerization initiator based on a water-soluble azo compound, and the polymer thus prepared is solvolyzed in water.

4. A process as claimed in claim 2, wherein from 0.05 to 1.5 equivalents of a mineral acid or of a base are used per formyl group equivalent of the polyvinylformamide obtained during polymerization.

5. A process as claimed in claim 2, wherein from 0.4 to 1 equivalent of a base is used per formyl group equivalent of the polyvinylformamide.

6. In a papermaking process comprising the deposition of a pulp stock to form a non-woven sheet, the improvement comprising: adding to the pulp stock a linear basic polymer as claimed in claim 1, to increase retention, drainage rate and flocculation.

7. In a process for papermaking, the improvement comprising adding from 0.005 to 0.5% by weight, based on the dry fiber, of a linear basic polymer containing 90 to 10 mole % of units of the formula

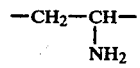

and from 10 to 90 mole % of units of the formula

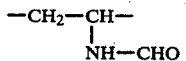

and having a Fikentscher K value of from 10 to 200 (measured in 0.5% strength aqueous sodium chloride solution at 25° C.) to stock before sheet formation.

8. The linear basic polymer of claim 1 containing 90 to 10 mole % of units of the formula

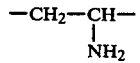

and 20 to 80 mole % of units of the formula

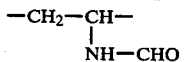

* * * * *